United States Patent
Stubbs et al.

(10) Patent No.: US 10,235,653 B1
(45) Date of Patent: Mar. 19, 2019

(54) PACKING LOCATIONS FOR INVENTORY ITEMS

(71) Applicant: Amazon Technologies, Inc., Seattle, WA (US)

(72) Inventors: Andrew Stubbs, Waltham, MA (US); Andrew D. Marchese, Concord, MA (US)

(73) Assignee: Amazon Technologies, Inc., Seattle, WA (US)

( * ) Notice: Subject to any disclaimer, the term of this patent is extended or adjusted under 35 U.S.C. 154(b) by 468 days.

(21) Appl. No.: 14/963,075

(22) Filed: Dec. 8, 2015

(51) Int. Cl.
*G06Q 10/08* (2012.01)
*B65D 25/08* (2006.01)

(52) U.S. Cl.
CPC .................................. *G06Q 10/087* (2013.01)

(58) Field of Classification Search
CPC .... G06Q 10/087; G06Q 10/08; G06Q 10/063; G06Q 10/06; G06Q 10/10; G06Q 10/0631; G06Q 30/02; A61J 7/0084; B65G 1/1376; B65G 2209/08; B65D 25/08; B65D 81/32; B65D 81/3211
USPC .......... 705/7.11; 700/213–220; 220/500–507
See application file for complete search history.

(56) References Cited

U.S. PATENT DOCUMENTS

| | | | | |
|---|---|---|---|---|
| 5,783,810 A * | 7/1998 | Kelly, Jr. | ........... | G06K 17/0029 235/383 |
| 8,340,812 B1 * | 12/2012 | Tian | ........ | G06Q 10/04 53/396 |
| 8,924,007 B2 * | 12/2014 | Arunapuram | ........ | G06Q 10/083 700/216 |
| 8,972,042 B2 * | 3/2015 | Uribe | ........... | B65G 1/1373 700/213 |
| 8,983,647 B1 * | 3/2015 | Dwarakanath | ....... | G06Q 10/087 700/216 |
| 9,082,148 B1 * | 7/2015 | Oczkowski | ........ | G06Q 30/0601 |
| 9,129,250 B1 * | 9/2015 | Sestini | ................ | G06Q 10/087 |
| 9,142,035 B1 * | 9/2015 | Rotman | ................... | G06T 7/62 |
| 9,315,344 B1 * | 4/2016 | Lehmann | ............... | G06Q 10/08 |
| 9,840,347 B1 * | 12/2017 | Linnell | ................ | B65D 81/051 |
| 9,914,278 B2 * | 3/2018 | Pettersson | ............... | B31B 50/00 |
| 9,926,131 B1 * | 3/2018 | Lehmann | ............... | B65D 85/62 |
| 9,932,145 B1 * | 4/2018 | Jeon | ................... | B65D 21/0233 |
| 9,962,921 B1 * | 5/2018 | Lyon | ....................... | G06F 17/50 |
| 9,969,571 B1 * | 5/2018 | Lehmann | ............... | B65G 57/03 |

OTHER PUBLICATIONS

Chung, et al. "On Packing Two-Dimensional Bins," *SIAM Journal of Algebraic Discrete Methods*, vol. 3, No. 1 (Mar. 1982), pp. 66-76.

* cited by examiner

*Primary Examiner* — Andrew Joseph Rudy
(74) *Attorney, Agent, or Firm* — Kilpatrick Townsend & Stockton LLP

(57) ABSTRACT

An inventory packing system and method are described. In some examples, a plurality of items having various dimensions may be accessed. A plurality of trays having various height dimensions into which the plurality of items can be packed may be identified. The plurality of items may be grouped into one or more groups based on height. Allocated inventory trays may be searched to locate free space that can function as a packing location for a first item. If free space is not found in the allocated inventory trays, other inventory trays can be allocated, searched, and free space identified in one of the other inventory trays.

19 Claims, 10 Drawing Sheets

PACKING LOCATIONS FOR INVENTORY ITEMS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
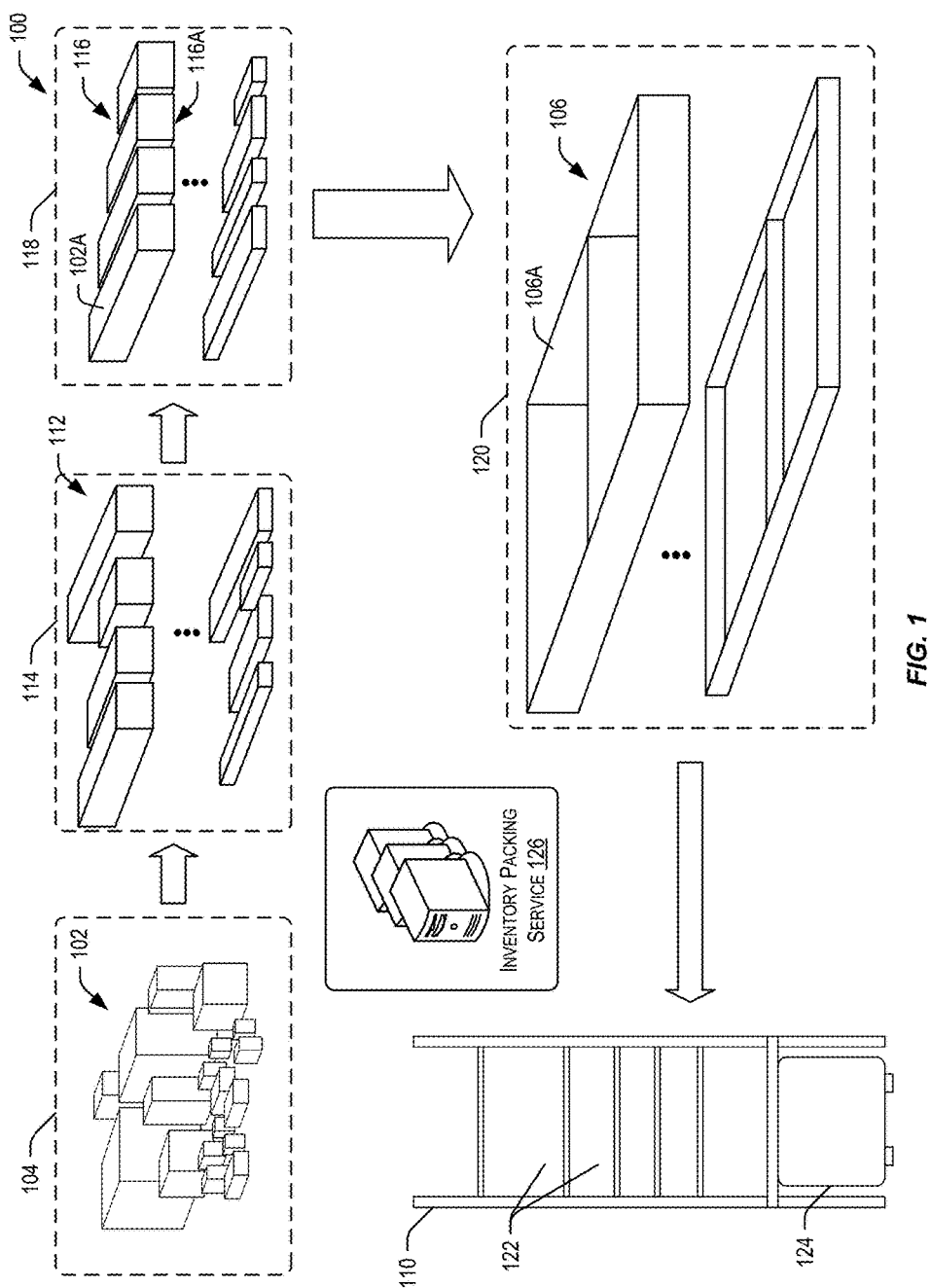
FIG. 1 is a diagram depicting techniques relating to determining packing locations for inventory items as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory packing system and related techniques for determining packing locations for inventory items in a high-density inventory storage system. In particular, the techniques and system described herein may be used for packing inventory items into inventory trays and for packing inventory trays into inventory holders. Discrete packing locations for inventory items, which may not already be stored, may be computed. These computed packing locations may be represented in a mapping that indicates packing locations for particular inventory items with respect to particular inventory trays that hold the particular inventory items and with respect to particular inventory holders that hold the particular inventory trays. This mapping can be shared with an operator that is packing inventory items and with an operator that later unpacks the inventory items. The computation of packing locations may be performed in a manner that is considerate of certain parameters such as gross cubic utilization (GCU). This may be considered the ratio of space occupied by inventory items to the space allocated to non-item storage. Even slight increases in GCU may result in significant cost savings for owners of storage facilities. These cost savings may be attributable to the inventory items being stored in a manner that seeks to minimize free space and results in dense packing arrangements. The computation of packing locations may also be performed in a manner that is considerate of other parameters such as unit picks per hour (UPH). This parameter may consider the time it takes for an operator to retrieve an inventory item from a stowed location. If the inventory items are packed too densely, then UPH may decrease. This decrease in UPH may result in increased operational costs, slowed shipping, and the like. Thus, the techniques described herein may be implemented to strike a balance between these and other parameters.

The techniques and system described herein may also be used to determine which configurations of inventory trays (e.g., heights, sizes, dividers, etc.) are best suited for receiving a set of inventory items based on one or more parameters (e.g., GCU, UPH, utilization, etc.). The set of inventory items, in this example, may include items that are forecasted to be stored at a particular facility or within a particular storage system that includes more than one facility. Existing or proposed inventory trays, including various configurations, may be evaluated to determine how, based on the set of inventory items, the different configurations of trays may affect the one or more parameters. For example, certain configurations that negatively affect GCU or are not utilized by the system, may be eliminated. This may include removing these configurations from ongoing use in the storage system or facility and/or excluding these configurations from being manufactured.

In a particular example, a set of inventory items from a database that includes a total set of inventory items may be accessed and packing locations for the inventory items in the set may be determined. The total set may correspond to all inventory currently stored, to be stored, or historically stored at a particular warehouse. The database may uniquely identify each inventory item, include a multi-dimensional representation of each inventory item, and may include certain characteristic information that describes characteristics of the inventory items (e.g., dimensions, weight, etc.). The set of inventory items may be oriented based on an orientation rule such that each shares the same orientation. For example, an orientation rule may indicate that all inventory items be oriented such that their shortest sides correspond to a height dimension. The set of oriented inventory items may be divided into one or more groups based on their height (e.g., 3", 6", and 12"). The number of height groups and the height divisions between groups may depend directly on characteristics of inventory trays into which the inventory items will be packed. For example, suppose three heights of inventory trays exist: 3" trays, 6" trays, and 12" trays. The set of inventory items may, therefore, be divided into three height groups corresponding to the three heights of inventory trays. Alternatively, the number of height groups and the height divisions between groups may dictate the characteristics, such as the heights, of the inventory trays. In some examples, the heights of the inventory items in the set may be the basis for orienting the inventory items. In this manner, the number of height groups and heights may be dependent on the composition of the inventory items. Each height group may then be sorted based on a characteristic dimension such as length. Each item in each height group may then be packed. This may be performed by determining whether a first item will fit in a first inventory tray, if not, a second inventory tray will be allocated and the first item will be placed in the second inventory tray. For a second item, it is determined first whether it will fit in the first inventory tray before searching in the second inventory tray or allocating a third inventory tray. This process may be repeated until each item from each height group has been placed in a tray. A similar process may be performed to determine where to place the packed inventory trays in inventory holders (i.e., a structure that holds one or more inventory trays). Once inventory trays are packed in inventory holders, a mapping may be generated that indicates a particular location for each inventory item with respect to the inventory tray and the inventory holder that holds the inventory item.

Turning now to the figures, FIG. 1 illustrates a diagram 100 that is representative of one or more techniques for determining packing locations for inventory items 102 in inventory trays 106 and holding locations for the inventory trays 106 in inventory holders 110 as described herein. The one or more techniques may be implemented using an inventory packing service 126 as described in more detail herein. Beginning in the top left-hand corner of the diagram 100, a set of inventory items 102 is illustrated within box 104. The set of inventory items 102 may be accessed from an inventory database that may be associated with the inventory packing service 126. The inventory items 102 may have various dimensions and characteristics. In this example, the inventory items 102 may each be represented by a multidimensional bounding box having a cuboidal shape. In some examples, packing locations for certain inventory items 102 having non-cuboidal shapes may also be determined. This may be achieved by representing the non-cuboidal shapes as cuboids. For example, an empty duffle bag may have no fixed shape or at least a fluid shape when it is empty. The space occupied by the empty duffle bag may be approximated by a cuboid and packed as described herein.

After accessing the inventory items 102, the inventory items 102 may be oriented in accordance with an orientation rule, such as shortest side height, and divided into one or more groups 112 based on height. The number of height groups and their corresponding heights may be determined automatically based on the composition of the inventory items 102 that were accessed. Given that the composition of the inventory items 102 may vary depending on the season, geographic location, etc., the number of corresponding heights of height groups may also similarly vary depending on season, geographic location, etc. The one or more height groups 112 are illustrated in box 114. The height groups 112 may have been oriented according to a shortest side height orientation rule. This may be evident in the box 114 because the orientation of the inventory items 102 in the height groups 112 is such that the shortest sides of the inventory items 102 extend in the height direction (e.g., vertically). In some examples, the shortest side height orientation may represent a stable orientation for most inventory items. In some examples, a stable orientation rule is provided that is separate from the shortest side height orientation rule. Additional discussion of orientation rules is provided herein.

After the height groups 112 have been formed, each height group 112 may be sorted according to length or other characteristic dimension to form one or more sorted height groups 116. The one or more sorted height groups 116 are illustrated in box 118. In some examples, the height groups 112 may be sorted according to some other characteristic other than length (e.g., aspect ratio, volume, weight, etc.).

After the sorted height groups 116 have been formed, the inventory items 102 in each sorted height group 116 may be analyzed to determine a packing location in one of the inventory trays 106 illustrated in box 120. In some examples, the inventory trays 106 may have various heights and various configurations of dividers. With respect to a first sorted height group 116A, a packing location for a first inventory item 102A may be determined. This may involve searching for free space in other inventory trays 106 having heights that correspond to the height of the first sorted height group 116A and that have previously been allocated to receiving the inventory items 102. If sufficient free space is not located in any of the other previously allocated inventory trays 106, a first inventory tray 106A of the same or similar height as the first sorted height group 116A may be allocated and the first inventory item 102A may be placed in the first inventory tray 106A. In some examples, placing an inventory item in an inventory tray may include allocating space in the inventory tray as "reserved" for the inventory item and indicating the reserved space as a packing location for the inventory item. In some examples, as part of allocating space as reserved, certain space surrounding the inventory item that is not taken up by the inventory item may be allocated as free space. In some examples, this process may be repeated for each inventory item 102 in the first sorted height group 116A and other sorted height groups 116, which may have heights that correspond to other inventory trays 106. In some examples, the inventory items 102 may be packed according to a first-fit decreasing rule. For example, after a first inventory item 102A has been packed, if adequate space exists next to the first inventory item 102A for a second inventory item 102, the second inventory item 102 may be placed in the space directly next to the first inventory item 102A.

Once an inventory tray 106 has been packed with one or more inventory items 102, a holding location in one of the inventory holders 110 may be determined. In some examples, after all inventory items 102 have been packed in their respective inventory trays 106, the inventory trays 106 may be packed in the inventory holders 110. The process of packing inventory trays 106 into inventory holders 110 may be performed in a manner similar to packing the inventory items 102 into the inventory trays 106. In some examples, techniques described herein may enable packing of the inventory trays 106 to form a single layer of the inventory items 102 or to form multiple layers of the inventory items 102. In either case, the inventory items 102 may be packed in a manner that is considerate of inventory item density (related to GCU) and the ability for a human operator or automated operator to retrieve the inventory items 102 from the inventory trays 106.

In some examples, the inventory holders 110 may include one or more shelves 122 on which the inventory trays 106 may be placed. The shelves 122 may be variously sized to correspond to the heights and other dimensions of the inventory trays 106. In some examples, the inventory holder 110 may be constructed to be moveable. In particular, a mobile drive unit 124 may be configured to detachably couple to the inventory holder 110 and move the inventory holder 110 to different locations within a warehouse. In some examples, the determination of packing locations and holding locations may be performed in a manner that is considerate of the fact that the inventory holder 110 will be moved, which may cause inventory items to shift.

In some examples, the packing locations and holding locations may be retained in a database or otherwise saved in memory such that they may be shared with and used by other entities. In some examples, this information may be considered inventory packing instructions and may be output by the inventory packing service 126.

Figure 2:
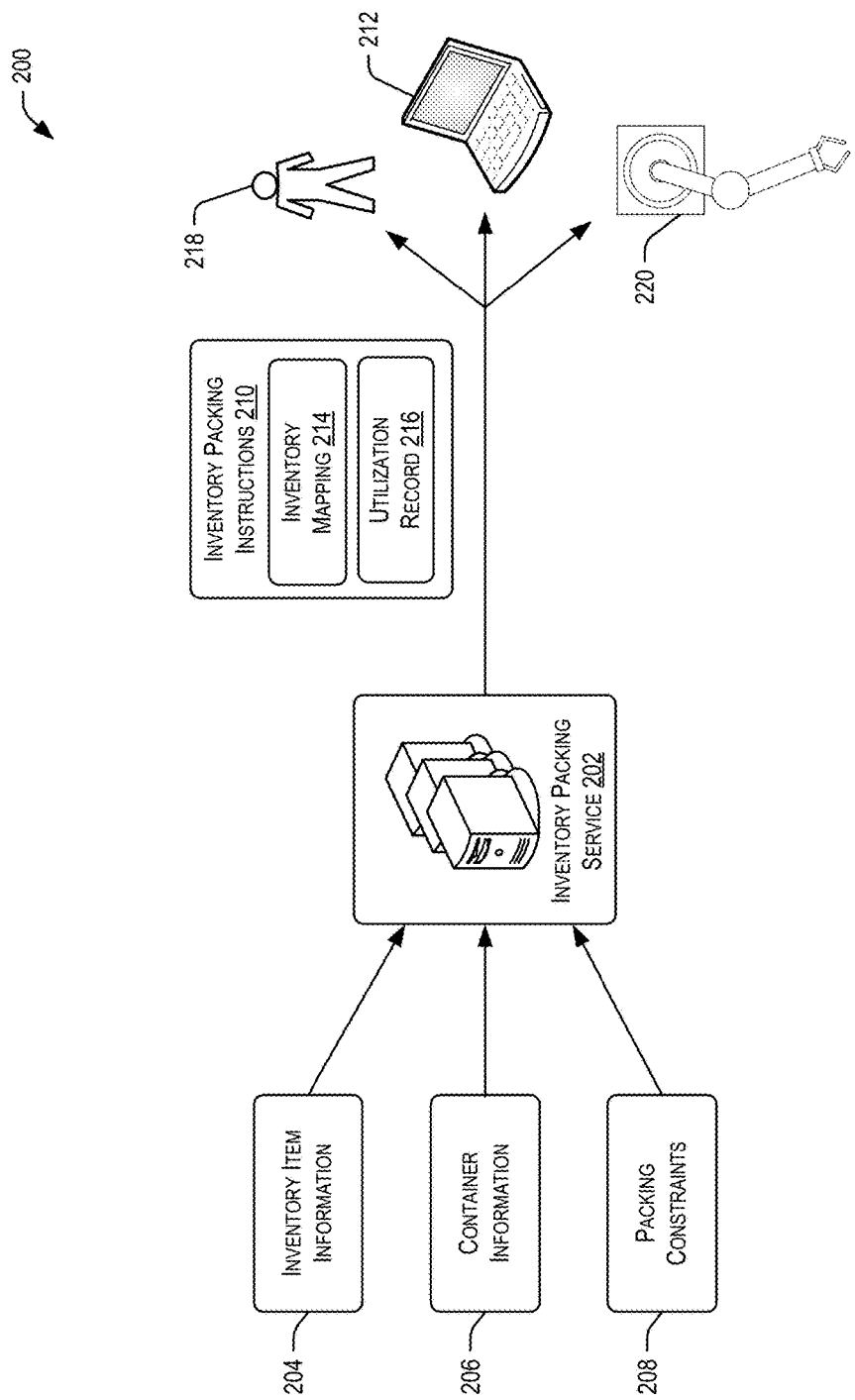
FIG. 2 is an example diagram depicting techniques relating to determining packing locations for inventory items as described herein, according to at least one example.

FIG. 2 illustrates a schematic 200 including an inventory packing service 202 in accordance with at least one example. The inventory packing service 202 is an example of the inventory packing service 126. As described in more detail herein, the inventory packing service 202 may be configured to implement the techniques described herein relating to determining packing locations for inventory items (e.g., as introduced with FIG. 1). To this end, the inventory packing service 202 may be configured to access certain information 204-208 in order to compute a set of inventory packing instructions 210, which may be provided to a computing device 212, a human operator 218, and/or an automated operator 220 (e.g., a robotic arm). In some examples, the computing device 212 is used by the human operator 218 to access the inventory packing instruction 210. Likewise, the computing device 212 (or a different computing device) may function to manage the operation of the automated operator 220. The schematic 200 provides a high-level introduction to the concept of computing the set of inventory packing instructions 210, with the description of other figures providing additional levels of detail.

The input information may include inventory item information 204, container information 206, and packing constraints 208. The inventory item information 204 may be information that identifies items that are capable of being stored as inventory. This can include items that are already being stored as inventory in a warehouse, items that are in transit to be stored as inventory, items that are forecasted to be stored as inventory, items that were at one time stored as inventory, and any suitable combination of the foregoing. In this manner, items may include any physical item capable of being physically stored. The inventory item information 204 may be accessed, received, or generated in any suitable manner. For example, the inventory item information 204 may be accessed from an inventory database that is local to the inventory packing service 202 or remote from the inventory packing service 202.

The inventory item information 204 may also include information that identifies and describes characteristics of the inventory items. For example, each inventory item may be associated with a unique item identifier, which may be assigned to the inventory item by an operator of the storage network in which the inventory item is held. In some examples, the unique item identifier is unique to a set of similar items, while in other examples, it is capable of uniquely identifying a particular item. As another example, each inventory item may be associated with a multidimensional digital representation of the inventory item. The multidimensional representation, in some examples, may be a bounding box that is sized to include the entirety of the inventory item therein. In this manner, the bounding box may be a minimum bounding box based on volume. The multidimensional representation of the item may be used to approximate a volume and a footprint to be devoted to the inventory item when it is stored. The inventory item information 204 may also include other information that describes characteristics of the inventory items such as weight, special packing instructions, center of mass, most stable orientation, and any other suitable information.

The container information 206 may be information that describes containers into which inventory items identified by the inventory item information 204 will be packed. In particular, the container information 206 may include information describing inventory trays which are configured to hold inventory items. The container information 206 may also include information describing inventory holders which are configured to hold the inventory trays. The container information 206 may describe dimensions and capacities of the inventory trays and the inventory holders. For example, the container information 206 for a particular inventory tray may indicate height, width, and length of the inventory tray, number and location of any dividers, whether the dividers are fixed or moveable, configurability of moveable dividers, maximum weight capacity, and any other suitable information descriptive of the particular inventory tray. The container information 206 may be accessed from a container database.

The packing constraints 208 may include constraints that the inventory packing service 202 may consider when determining the inventory packing instructions 210. Such constraints may be any suitable constraint based on physical characteristics of the inventory items, inventory velocities of the inventory items, historical sales information for the inventory items, physical characteristics of inventory holders, physical characteristics of mobile drive units that move the inventory holders, packing density per inventory tray, packing density per inventory holder, packing density per warehouse, packing density per storage system, perceptibility (human and/or machine) of inventory items with regards to surrounding inventory items (e.g., avoid placing like colored items next to each other), and any other suitable constraint relating to packing inventory items.

The inventory packing service 202 may access the information 204-208 in order to determine the inventory packing instructions 210. The inventory packing instructions 210 may include inventory mapping 214 and/or a utilization record 216. In some examples, the inventory mapping 214 may be a mapping of packing locations of inventory items with respect to inventory trays and inventory holders. Each packing location may be unique to the inventory item to which it belongs. In this manner, the packing location may function as an address to identify where to pack an inventory item during stowing and where to look for the inventory item during retrieval. The inventory mapping 214 may be provided to the human operator 218 and/or the automated operator 220 as part of packing inventory items into inventory trays. To this end, the inventory mapping 214 may be human-readable and/or machine-readable.

In some examples, the inventory mapping 214 may be prepared each time the inventory packing service 202 analyzes a set of inventory items described by the inventory item information 204. In some examples, an inventory mapping 214 may be prepared each time the inventory packing service 202 determines a packing location of an inventory item. As subsequent packing locations are determined, the inventory mapping 214 may be updated accordingly. A particular inventory mapping 214 may identify an inventory item, a packing location for the inventory item within an inventory tray, and an orientation of the inventory item. What is included in the inventory mapping 214 may depend on the complexity of packing. For example, for large items that take up the entire space of inventory tray, the inventory mapping 214 may simply identify the item and the inventory tray. For smaller items, the inventory mapping 214 may not only identify each small item and their respective locations in an inventory tray, but may also identify certain neighboring items that will be used to support the smaller items.

The utilization record 216 may indicate the extent to which certain configurations of inventory trays may be utilized based the computations of the inventory packing service 202. For example, the utilization record 216 may indicate, for a set of six different inventory tray types, which inventory trays are selected most often by the inventory packing service 202. The utilization record 216 may also indicate which inventory trays most affect GCU. The information generated in the utilization record 216 may be used by operators of the storage system to determine which configurations of inventory trays should be continued and which should be discontinued. The computing device 212 may be used to access the utilization record 216.

Figure 3:
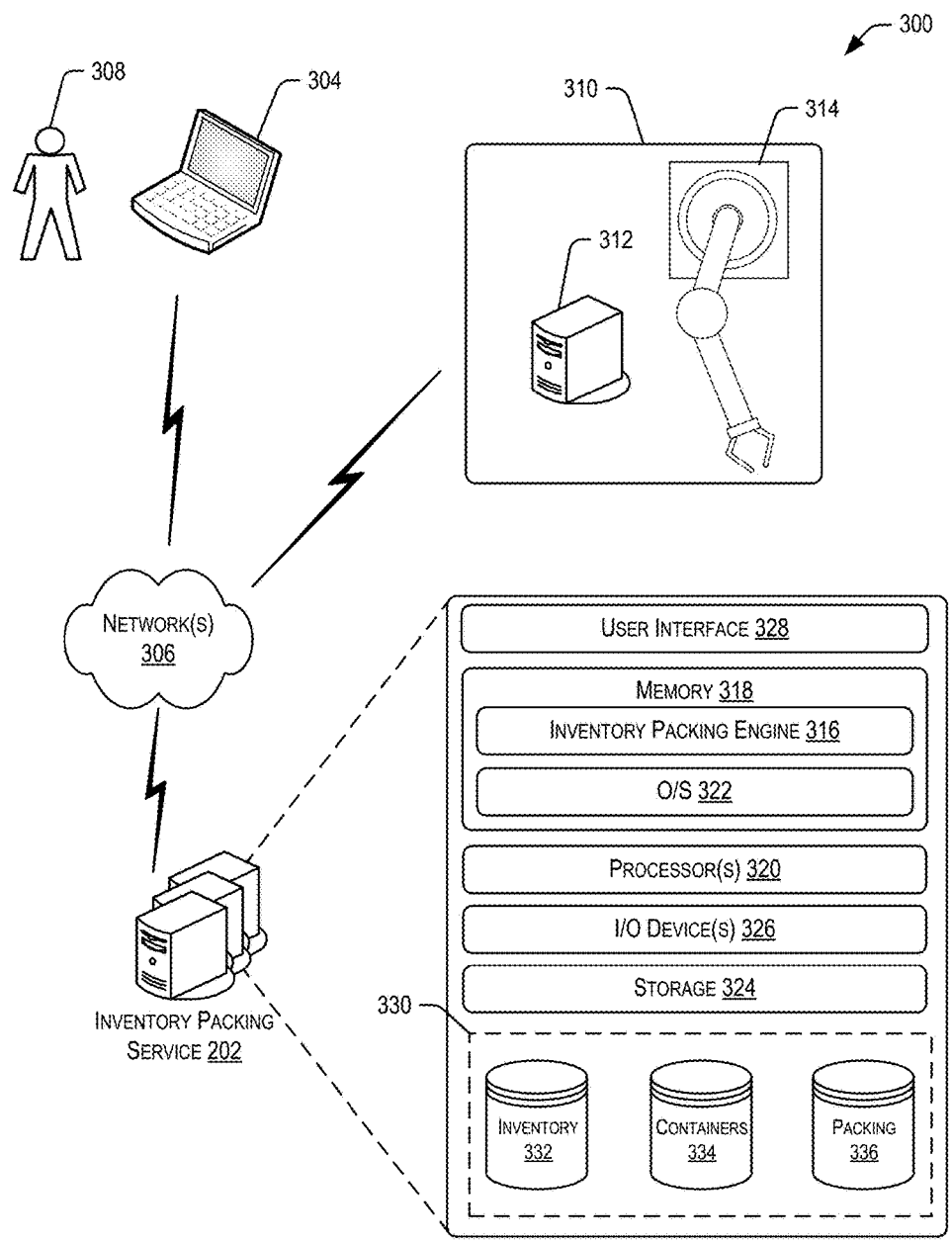
FIG. 3 is an example schematic architecture for implementing techniques relating to determining packing locations for inventory items as described herein, according to at least one example.

FIG. 3 illustrates an example architecture 300 for implementing techniques relating determining packing instructions for inventory items as described herein. The architecture 300 may include the inventory packing service 202 in communication with a user device 304 and an automated operator system 310 via one or more networks 306 (hereinafter, "the network 306"). The user device 304 may be operable by a user 308 to interact with the inventory packing service 202. The user device 304 may be an example of the computing device 212. The user 308 may be an example of the human operator 218. The network 306 may include any one or a combination of many different types of networks, such as cable networks, the Internet, wireless networks, cellular networks, and other private and/or public networks.

Turning now to the details of the user device 304, the user device 304 may be any suitable type of computing device such as, but not limited to, a tablet, a mobile phone, a smart phone, a personal digital assistant (PDA), a laptop computer, a desktop computer, a thin-client device, a tablet computer, or any other suitable device capable of communicating with the inventory packing service 202 via the network 306 in accordance with techniques described herein. For example, the inventory packing service 202 may provide inventory packing instructions to the user device 304 and the user 308 may execute the instructions by packing inventory items in accordance with the instructions.

The automated operator system 310 may include a management device 312 and an automated operator 314. The automated operator 314 is an example of the automated operator 220. In some examples, the inventory packing service 202 may provide inventory packing instructions to the management device 312 which may process the instructions in order to manage the operation of the automated operator 314. The automated operator 314 may be a robotic arm or other automated storage or retrieval device.

Turning now to the details of the inventory packing service 202, the inventory packing service 202 may include one or more service provider computers, perhaps arranged in a cluster of servers or as a server farm, and may host web service applications. These servers may be configured to perform computing operations as described herein. In some examples, the servers (and the components thereof) may be distributed throughout more than one location. The servers may also be virtual computing resources. The inventory packing service 202 may be implemented as part of an inventory management system that is associated with an electronic marketplace. Through the electronic marketplace users may place orders for items. In response, the inventory management system may determine shipping instructions for retrieving the items from their physical storage locations and coordinating their shipping. In some examples, the shipping instructions may be based on the inventory packing instructions described herein. For example, a retrieval portion of the shipping instructions may include an inventory mapping of the packing locations for the items. The retrieval portion may be provided to the user 308 (e.g., via the user device 304) and/or to the automated operator system 310 for retrieval of the items. In some examples, the inventory packing service 202 is implemented as a service within the inventory management system. In this manner the inventory packing service 202 can access components of the inventory management system and easily share information with the inventory management system. For example, data such as the inventory item information 204, the container information 206, and the packing constraints 208 may be shared between the inventory packing service 202 and the inventory management system.

The inventory packing service 202 may include at least one memory 318 and one or more processing units (or processor(s)) 320. The processor 320 may be implemented as appropriate in hardware, computer-executable instructions, software, firmware, or combinations thereof. Computer-executable instruction, software, or firmware implementations of the processor 320 may include computer-executable or machine-executable instructions written in any suitable programming language to perform the various functions described. The memory 318 may include more than one memory and may be distributed throughout the inventory packing service 202. The memory 318 may store program instructions that are loadable and executable on the processor(s) 320, as well as data generated during the execution of these program instructions. Depending on the configuration and type of memory including the inventory packing service 202, the memory 318 may be volatile (such as random access memory (RAM)) and/or non-volatile (such as read-only memory (ROM), flash memory, or other memory). The memory 318 may include an operating system 322 and one or more application programs, modules, or services for implementing the features disclosed herein including at least an inventory packing engine 316.

The inventory packing service 202 may also include additional storage 324, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 324, both removable and non-removable, are examples of computer-readable storage media. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the inventory packing service 202.

The inventory packing service 202 may also include input/output (I/O) device(s) and/or ports 326, such as for enabling connection with a keyboard, a mouse, a pen, a voice input device, a touch input device, a display, speakers, a printer, or other I/O device.

The inventory packing service 202 may also include a user interface 328. The user interface 328 may be utilized by an operator or other authorized user to access portions of the inventory packing service 202. In some examples, the user interface 328 may include a graphical user interface, web-based applications, programmatic interfaces such as application programming interfaces (APIs), or other user interface configurations. The inventory packing service 202 may also include a data store 330. In some examples, the data store 330 may include one or more data stores, databases, data structures, or the like for storing and/or retaining information associated with the inventory packing service 202. For example, the data store 330 may include databases, such as inventory database 332, container database 334, and packing database 336.

The inventory database 332 may be configured to retain information such as the inventory item information 204 and other suitable inventory information that identifies items. The information in the inventory database 332 may be organized in any suitable manner to enable access by components of the inventory packing service 202 such as the inventory packing engine 316. The inventory database 332 may include an entry for each inventory item that the inventory packing service 202 may encounter. As a result, this may include entries on a scale of hundreds of thousands or even millions. In some examples, the inventory database 332 includes only entries for those items in a particular facility or set of facilities (e.g., in a region). In this manner, the techniques described herein may be implemented on a local, regional, national, or worldwide scale. When an inventory item is a product for sale, the inventory database 332 may include a product identifier, a description of the product, one or more stock images of the product, a bounding box representation of the product, one or more actual images of the product (e.g., taken as it entered a facility), dimensions of the product (e.g., height, width, length), a location of a center of mass, a total weight, special packing instructions (e.g., cannot stack on top of product, stack on top cannot exceed 5 lbs, etc.), expected time for storing the product (e.g., to determine a velocity of the product), related products (e.g., products that are often bundled with this product), and any other type of information related to the product.

The container database 334 may be configured to retain information such as the container information 206 and other suitable information relating to inventory trays and inventory holders. For example, as described herein, the container database 334 may include information that describes physical characteristics of inventory trays. The container database 334 may also include information that describes physical characteristics of inventory holders. For example, an entry for a particular inventory holder (or type of inventory holder) may indicate a capacity (e.g., in terms of weight, location of center of mass, etc.), a number of inventory trays it can accept, configurations of inventory trays that it can accept (e.g., different height configurations), and any other suitable information descriptive of inventory holders.

The packing database 336 may be configured to retain information such as the inventory packing instructions 210. For example, the packing database 336 may include an inventory mapping for a set of inventory items. For a particular inventory item, the inventory mapping may include a set of Cartesian coordinates that define a packing location for the particular inventory item. In some examples, the packing database 336, whether in connection with the inventory mapping or not, may include any data suitable for retrieving the particular inventory item. For example, the packing database 336 may include one or more images of the particular item in the packing location. These images (and mapping) may be provided to the user 308 or the automated operator system 310 as part of retrieving the item. The one or more images may also include one or more items that are adjacent to the particular item.

Figure 4:
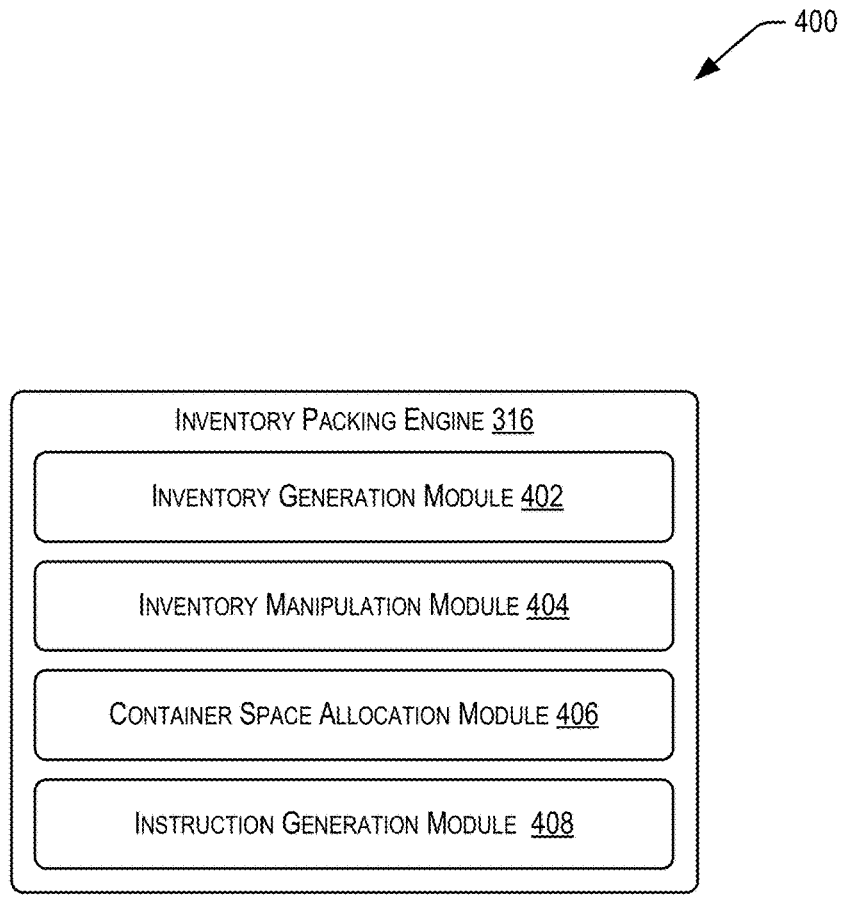
FIG. 4 is an example device for implementing techniques relating to determining packing locations for inventory items as described herein, according to at least one example.

FIG. 4 illustrates an example device 400 including the inventory packing engine 316. The inventory packing engine 316 may be configured to manage one or more sub-modules, components, and/or services directed to examples disclosed herein. In some examples, the inventory packing engine 316 may include an inventory generation module 402, an inventory manipulation module 404, a container space allocation module 406, and an instruction generation module 408. While these modules are illustrated in FIG. 4 and will be described as performing discrete tasks with reference to the flow charts, it is understood that FIG. 4 illustrates example configurations and other configurations performing other tasks and/or similar tasks as those described herein may be implemented according to the techniques described herein.

The inventory generation module 402 may be configured to access inventory items from one or more databases including inventory (e.g., the inventory database 332). The inventory generation module 402 may retrieve certain sets of inventory items based on any number of parameters. For example, assume that an operator of a storage system is considering storing a plurality of new products. It may be desirable for the owner to understand the effect that such an introduction will have on the storage system in terms of GCU or any other parameter. To this end, the inventory generation module 402 may access item records for each of the plurality of new products. If multidimensional representations have not been generated and associated with the item records, the inventory generation module 402 may generate such representations. Other modules of the inventory packing engine 316 may then function to evaluate the effects. In some examples, the inventory generation module 402 simply receives a list of item records from a separate computer system and stores them in the inventory database 332 prior to sharing the list with the other modules of the inventory packing engine 316. In this manner, the inventory generation module 402 may also function to manage the inventory database 332.

The inventory manipulation module 404 may be configured to perform one or more operations with respect to the inventory items accessed by the inventory generation module 402. In some examples, this may include orienting the inventory items in accordance with an orientation rule (e.g., shortest side height, shortest side width, stable orientation, center of mass, random, etc.), grouping the inventory items into one or more groups based on a characteristic, such as height, and sorting the one or more groups according to another characteristic or dimension, such as length. In this manner, the inventory manipulation module may be configured to manipulate inventory items in order to prepare for determining packing locations for the inventory items.

The container space allocation module 406 may be configured to search inventory trays to locate space for receiving inventory items. To this end, the container space allocation module 406 may be configured to allocate unused space in inventory trays as free space, and allocate free space to packing locations corresponding to inventory items. In some examples, the container space allocation module 406 may be configured to recursively search for free space in all inventory trays that have been allocated for receiving items before allocating a new tray for receiving inventory items. The container space allocation module 406 may be configured to keep track of how space in an inventory tray has been allocated. For example, what percentage of the space is allocated to packing locations for items and what percentage of the space is unused. The container space allocation module 406 may also be used to search for packing locations in inventory holders to receive inventory trays.

The instruction generation module 408 may be configured to generate instructions based on output from the container space allocation module 406. Such instructions may include a mapping of packing locations for inventory items with respect to inventory trays and inventory holders. In some examples, the output from the instruction generation module 408 may be similar to the inventory packing instructions 210 described herein.

Figure 5:
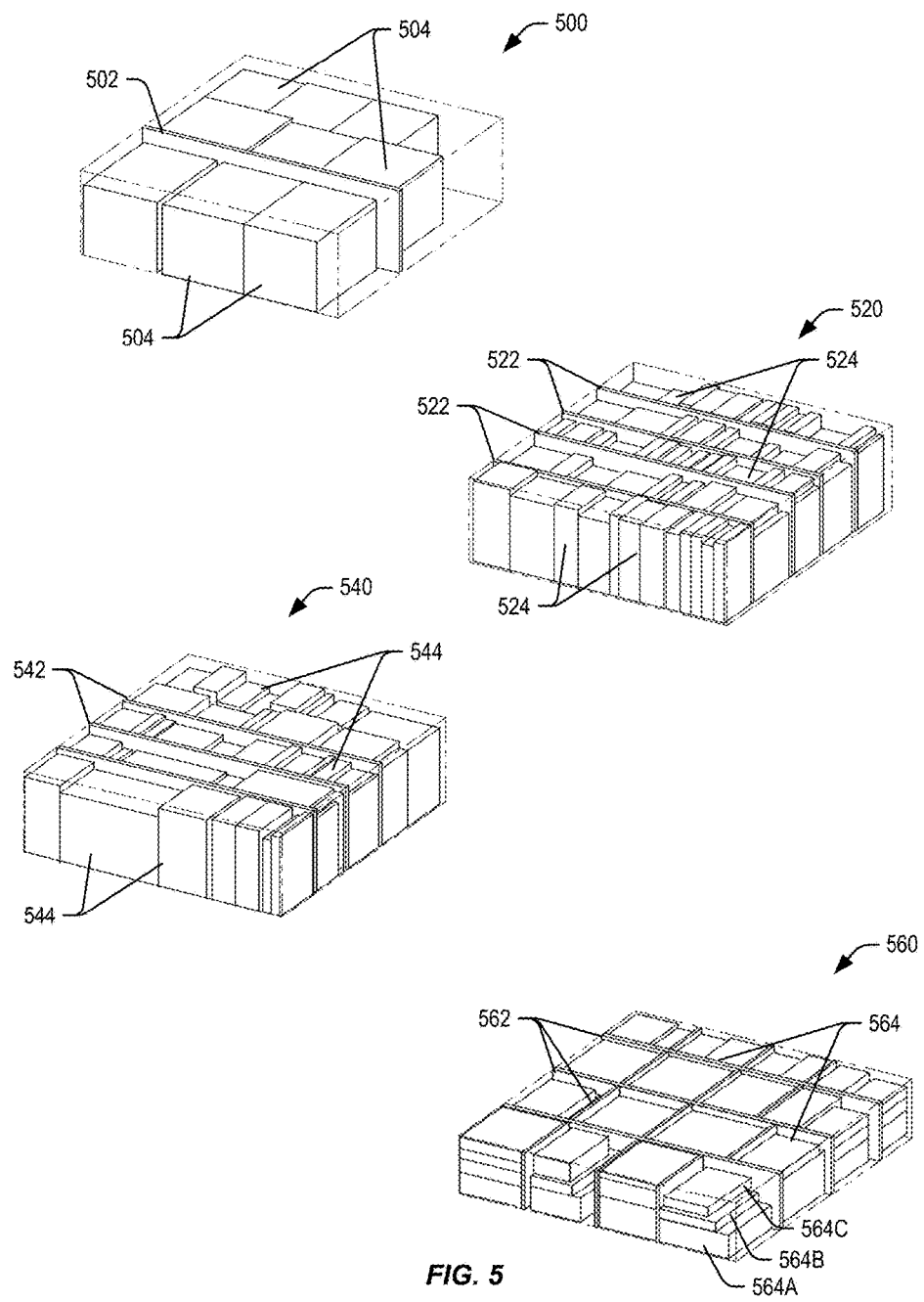
FIG. 5 includes example inventory trays for implementing techniques relating to determining packing locations for inventory items as described herein, according to at least one example.

FIG. 5 illustrates inventory trays 500, 520, 540, and 560. The inventory trays 500, 520, 540, and 560 are each examples of the inventory trays 106 described herein. In FIG. 5, each of the inventory trays 500, 520, 540, and 560 are illustrated to highlight different orientations of inventory items and different configurations of dividers. Each inventory tray 500, 520, 540, and 560 may be defined as a rectangular box with an opening along the horizontal top side. In some examples, other trays may have non-rectangular shapes and may have more than one opening, including openings along the vertical sides. The openings may allow for placement of the inventory items into the trays and for removal of the inventory items from the trays.

The inventory tray 500 may include a divider 502 separating two rows of inventory items 504. The divider 502 may be considered a widthwise divider and may divide up the inventory tray 500 into two bins. The nearer bin may include three inventory items 504, while the further bin may include two rows of inventory items 504 each including three inventory items 504. Thus, in some examples, the inventory items 504 may be placed in inventory trays without dividers 502 separating the inventory items 504. The inventory items 504 in the inventory tray 500 have been oriented according to a shortest side height orientation rule. In this manner, the side of each inventory that is shortest is defined as the height dimension. When in the shortest side height orientation, the inventory items 504 may be more stable than in some other orientations. This may be because the centers of mass of the inventory items 504 are lower as compared to other orientations (e.g., shortest side width). In some examples, prior to placement of the inventory items 504 into the inventory tray 500, the inventory items 504 may have been oriented in accordance with the orientation rule.

The inventory tray 520 may include a plurality of dividers 522 separating a plurality of rows of inventory items 524 to form a plurality of bins. In some examples, the illustrated dividers 522 may be considered widthwise dividers. In some examples, the inventory tray 520 may also include lengthwise dividers extending orthogonal to the widthwise dividers 522. Any suitable combination of widthwise and lengthwise dividers may be included. The dividers 522 may be fixed or may be configurable in some way. For example, the inventory tray 520, is divided into five bins. When the dividers 522 are fixed the number of bins may be fixed. However, when the dividers 522 are configurable the number of bins may be variable depending on how the system described herein allocates the inventory items 524. In some examples, the inventory tray 520 includes attachment locations therein which are configured to receive the dividers 522. In this manner, there may be a finite number of possible configurations of the dividers 522 in the inventory tray 520. For example, dividers may be placed in the inventory tray 520 at 1" intervals. Thus, the inventory tray 520 may be suitable for receiving a wide variety of inventory items 524 at various times. In some examples, the dividers 522 may not have to attach to the inventory tray 520 or may otherwise be capable of placement anywhere in the inventory tray 520. In this manner, there may be an infinite number of possible configurations of the dividers 522 in the inventory tray 520. The number, however, may be limited by excluding unreasonable placements.

The inventory items 524 in the inventory tray 520 have been oriented according to a shortest side width orientation rule. In this manner, the side of each inventory item 524 that is shortest is defined as the width dimension. This may present an orientation that achieves positive results as it relates to GCU, but practically may present challenges as it relates to stability. This may be because the centers of mass of the inventory items 524 are located at a greater distance from the bottom of the inventory tray 520. This may result in the inventory items 524 tending to topple over when the inventory tray 520 is moved and/or when certain neighboring inventory items 524 are removed from the inventory tray 520. To address this potential for toppling, item support articles may be placed in between the inventory items 524. The item support articles may be structurally similar to bookends and may function in a similar manner to keep the inventory items 524 from toppling. The item support articles may be included in addition to the dividers 522. In some examples, prior to placement of the inventory items 524 into the inventory tray 520, the inventory items 524 may have been oriented in accordance with the shortest side width orientation rule.

Like the inventory tray 520, the inventory tray 540 may include a plurality of dividers 542 separating a plurality of rows of inventory items 544 to form a plurality of bins. The dividers 542 may be fixed or configurable as described herein. The inventory items 544 in the inventory tray 540 have been oriented according to a random orientation rule or according to a stability orientation rule.

In this manner, some of the shortest sides of inventory items 544 are defined as the width and some shortest sides are defined as the length. In some examples, the random orientation rule may present a compromise between the shortest side height rule and the shortest side width rule. In some examples, prior to placement of the inventory items 544 into the inventory tray 540, the inventory items 544 may have been oriented in accordance with the random orientation rule. This may include orienting the items in accordance with a certain orientation and then randomizing that orientation. In some examples, the random orientation rule may be implemented to randomize a natural orientation in which an item is presented. This may be the orientation in which the bounding box of an item record is saved. For example, a natural orientation for a box with a laptop computer may be shortest side height, but orienting in accordance with the random orientation rule may result in the box having a resulting orientation of shortest side width. In some examples, the stability orientation rule may seek to orient items in a most stable orientation, which may be based on locations of centers of mass of items. For example, consider a thin box that has a very heavy object packed along a vertical side of the box, with a center of mass located along the vertical side. Using the stability orientation rule, the box may be aligned with the vertical side down (i.e., with the center of mass closest to the bottom of the inventory tray). In some examples, prior to placement of the inventory items 544 into the inventory tray 540, the inventory items 544 may have been oriented in accordance with the stability orientation rule.

The inventory tray 560 may also include a plurality of dividers 562, which may be widthwise and lengthwise. The dividers 562 may divide the inventory tray 560 into a plurality of bins. The dividers 562 may function like the other dividers described herein and may therefore be fixed or configurable. Unlike the previous inventory trays which each include only a single layer inventory items, the inventory tray 560 may include multiple layers. In particular, each bin may include an inventory stack including one or more inventory items 564. The inventory items 564 in the inventory tray 560 may have been oriented according to a shortest side height orientation rule. In this manner, the side of each inventory item 564 that is shortest is defined as the height dimension. When multiple layers of inventory is a possibility, the process described herein may search for free space that includes an extruded area that lies above inventory items in addition to any free space where items have not yet been placed. This is compared to a single layer approach in which free space may be limited to the area where items have not yet been placed.

In some examples, the inventory stacks may be built in a manner that attempts to place items of the same type in a stack. For example, a particular stack may be reserved for and include copies of the same DVD stacked on top of each other. Building inventory stacks in this manner may increase GCU because the items may nest well and may also decrease UPH because items may not need to be removed from the stack in order to access lower items. In some examples, the inventory stacks may be built in a manner that considers the stability of the stacks. For example, larger inventory items may be placed in the bottom layer, with progressively smaller inventory items being placed thereon. In this manner, the inventory stacks may begin to resemble pyramids of inventory items. For example, inventory item 564A may have been placed initially. As compared to inventory items 564B and 564C, the inventory item 564A may have the largest footprint in the inventory stack that includes 564A-564C. The next largest footprint may belong to the inventory item 564B and then to 564C. In this manner, the stability of the inventory stack may be maintained. In some examples, the inventory tray 560 may be configured to be tilted at a single angle or a compound angle in order to cause the inventory items 564 to slide to one side of the inventory tray 560 or to one corner of the inventory tray 560. This may improve the stability of the inventory items 564 in the inventory tray 560.

Figure 6:
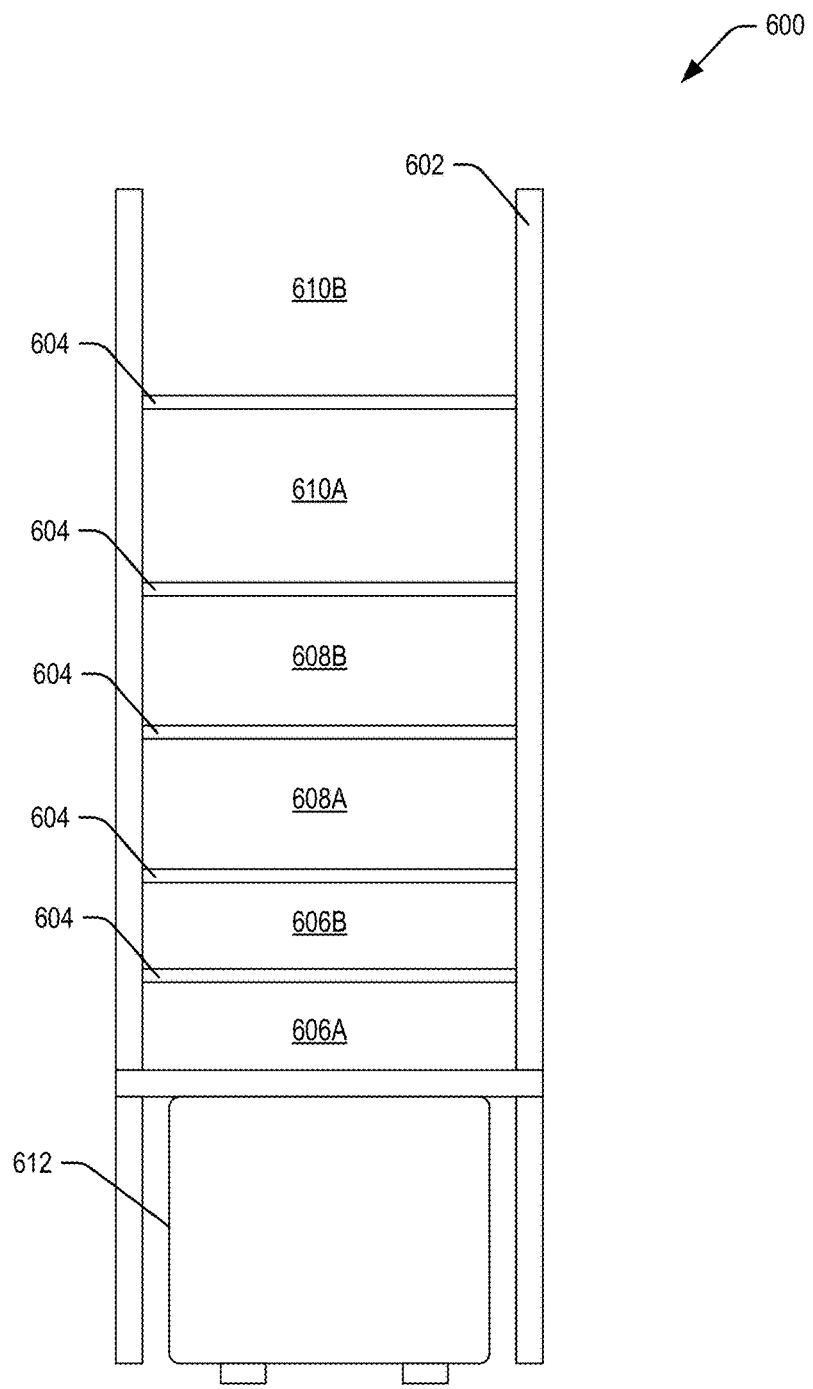
FIG. 6 is an example inventory holder for implementing techniques relating to determining packing locations for inventory items as described herein, according to at least one example.

FIG. 6 illustrates an inventory holder 600 in accordance with at least one example. The inventory holder 600 is an example of the inventory holder 110 described herein. The inventory holder 600 may include a frame 602. The frame 602 may provide structural support to one or more shelves 604. The shelves 604 may be configured to receive inventory trays as described herein. The shelves 604 may be fixed with respect to the frame 602 or may be configurable with respect to the frame 602. For example, as illustrated, the shelves 604 may be positioned in the frame 602 to create three heights of compartments 606A, 606B; 608A, 608B; and 610A, 610B. In some examples, greater or fewer number of compartments and/or heights may be included. In this example, the heights of the compartments 606-610 may correspond to heights of inventory trays as described herein. In some examples, certain inventory holders 600 may include only one height of compartment (e.g., all compartments 606). In some examples, the shelves 604 may be fully configurable in order to accommodate any combination of trays having the same or varied heights.

In some examples, the inventory holder 600 may not include the shelves 604. In this example, the inventory trays may be stacked on top of each other and held by the frame 602. In order to access items in a bottom inventory tray, the other inventory trays (on top of the required tray) may be removed. When the inventory trays are stacked on top of each other, determining holding locations may be simplified. This may be because there is effectively no constraint, besides overall height and capacities, on where an inventory tray may be stacked. Thus, inventory trays of different heights may be placed directly on top of each other. For example, once an inventory tray of height 5" is full, it can immediately be placed on the inventory holder. When a next inventory tray of height 12" is full, it too can immediately be placed on the 5" inventory tray.

The inventory holder 600 is illustrated as coupled with a mobile drive unit 612. The mobile drive unit 612 may dock with and transport the inventory holders 600 within a facility. The mobile drive unit 612 may dock with the inventory holder 600 by connecting to, lifting, and/or otherwise interacting with the inventory holder 600 in any other suitable manner so that, when docked, the mobile drive unit 612 is coupled to and/or supports the inventory holder 600 and can move the inventory holder 600 within a facility.

Figure 7:
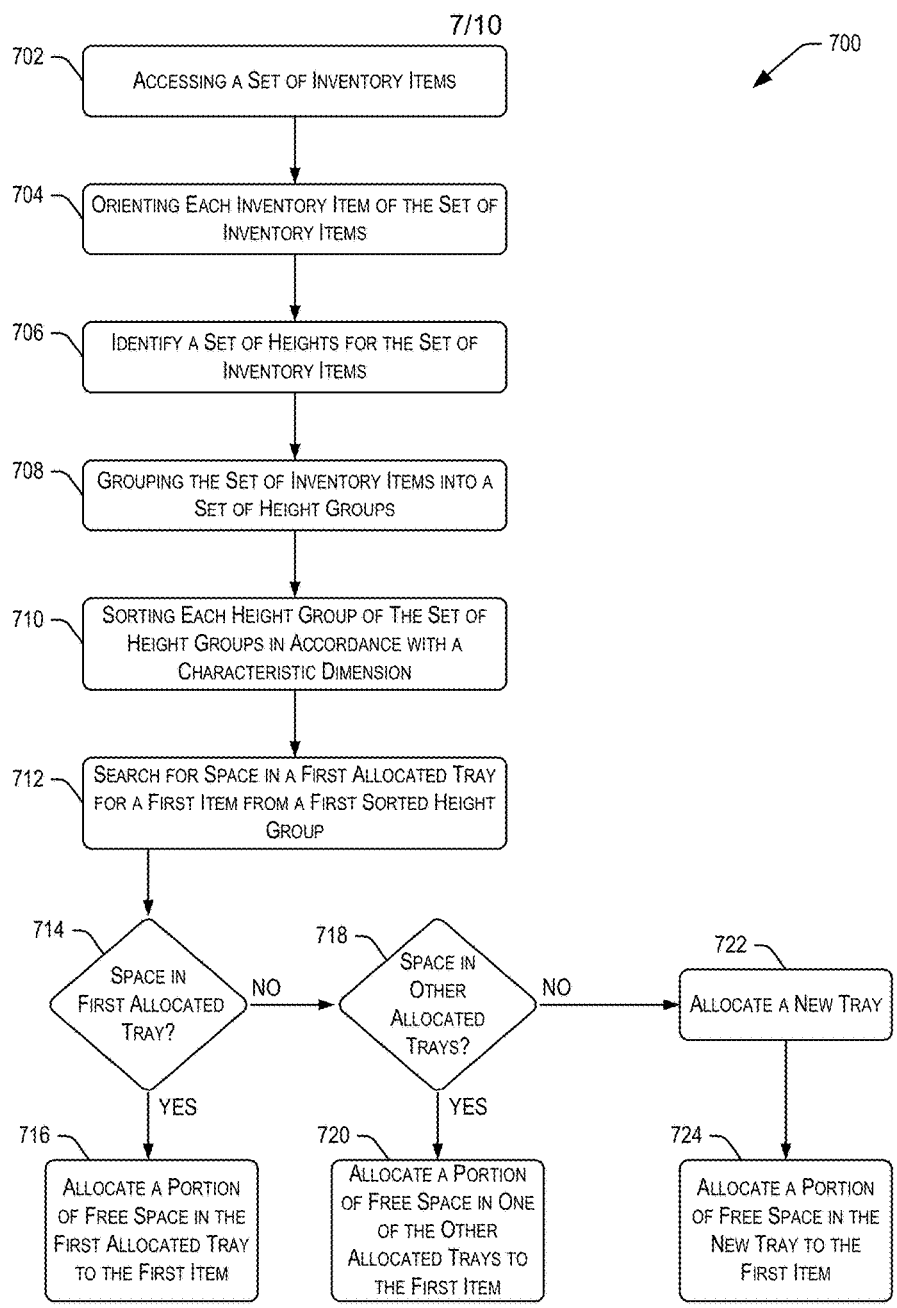
FIG. 7 is a flow diagram depicting example acts for implementing techniques relating to determining packing locations for inventory items as described herein, according to at least one example.
Figure 8:
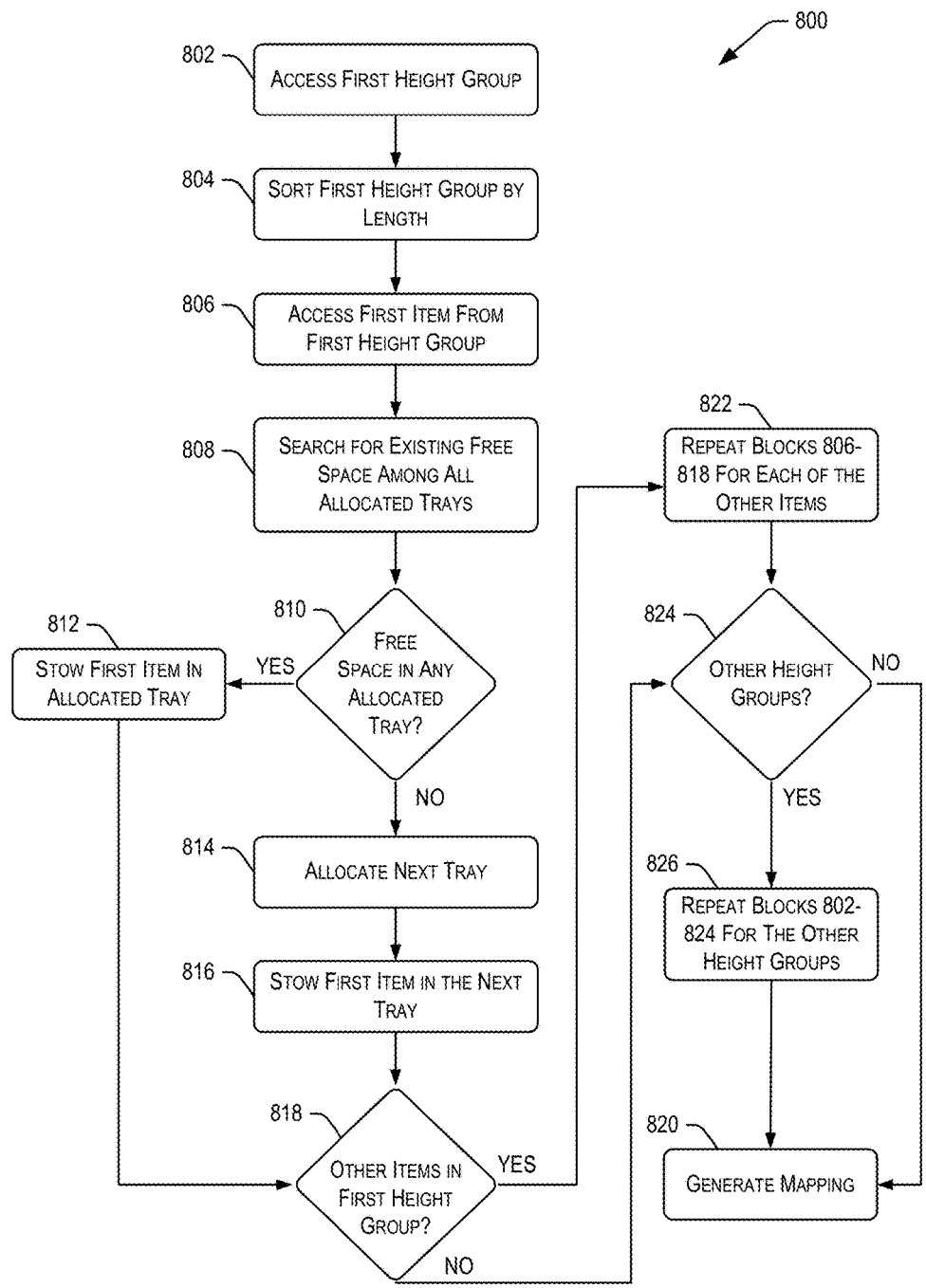
FIG. 8 is a flow diagram depicting example acts for implementing techniques relating to determining packing locations for inventory items as described herein, according to at least one example.
Figure 9:
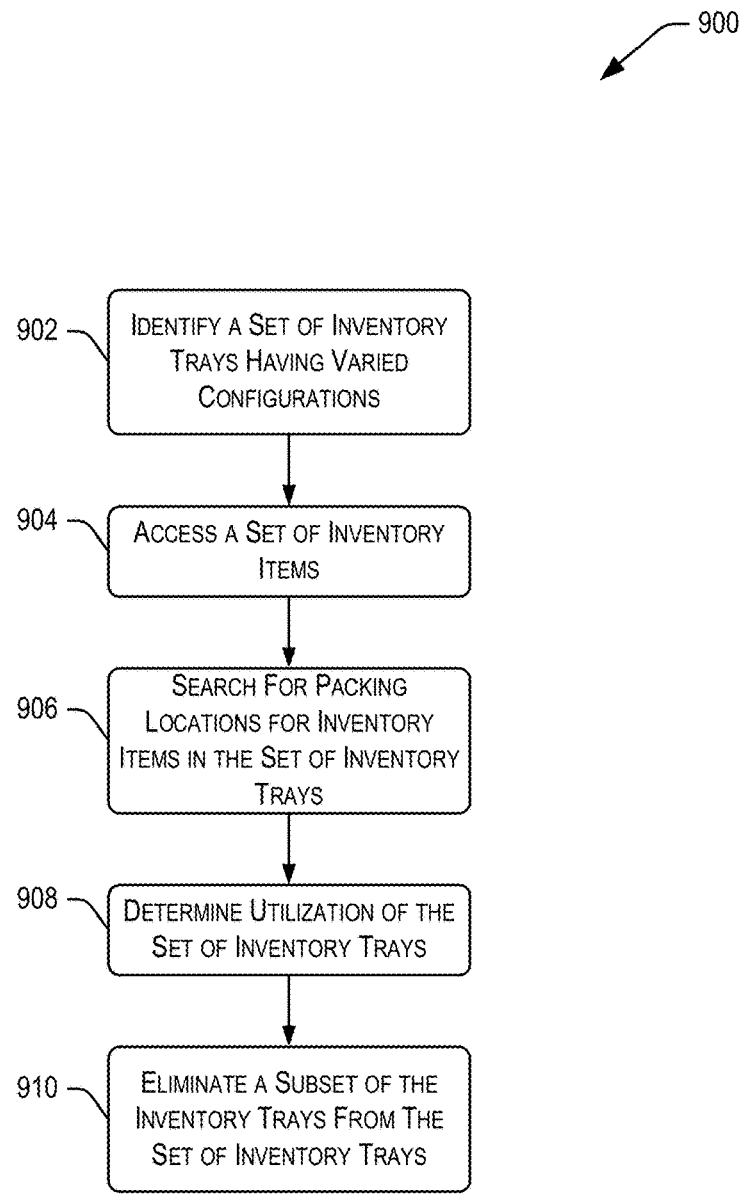
FIG. 9 is a flow diagram depicting example acts for implementing techniques relating to determining packing locations for inventory items as described herein, according to at least one example.

FIGS. 7, 8, and 9 illustrate example flow diagrams showing respective processes 700, 800, and 900, as described herein. These processes 700, 800, and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 7 depicts the process 700 including example acts or techniques relating to allocating free space as a packing location for a first inventory item in accordance with at least one example. The inventory packing engine 316 (FIG. 3) of the inventory packing service 202 (FIG. 2) may perform the process 700 of FIG. 7. The process 700 may be performed when inbound inventory is being prepared to be stowed in a facility or a group of facilities in a storage system. In some examples, the process 700 may be performed for a certain region based on inventory stored in that region. The process 700 may also be performed prior to a season when the inventory in the storage network typically changes. For example, the inventory at Christmas time may be markedly different than the inventory around the Fourth of July. In this manner, the process 700 may be performed periodically to ensure high GCU.

The process 700 begins at 702 by accessing a set of inventory items. This may be performed by the inventory generation module 402 (FIG. 4). The set of inventory items may be part of a larger set of inventory items. For example, the larger set may include around 1,000,000 inventory items, while the set may include around 100,000. The individual inventory items may have various dimensions and characteristics. The set of inventory items may be represented by multidimensional bounding boxes.

At 704, the process 700 orients each inventory item of the set of inventory items. This may be performed by the inventory manipulation module 404 (FIG. 4). Orienting each inventory item may include rotating and aligning each inventory item in accordance with an orientation rule as described herein. For example, the set of inventory items may be oriented to have shortest side height orientations.

At 706, the process 700 identifies a set of heights for the set of inventory items. This may be performed by the inventory manipulation module 404. Identifying the set of heights may include identifying a set of allowable heights corresponding to a set of height dimensions of inventory trays configured to receive the inventory items. For example, if the set of height dimensions indicates that there are five different heights of inventory trays (e.g., 4", 6", 8", 10", and 12"), the set of allowable heights may include five possible groups, with each group corresponding to one of the five different heights of inventory trays.

At 708, the process 700 groups the set of inventory items into a set of height groups. This may be performed by the inventory manipulation module 404. Grouping the set of inventory items into the set of height groups may be based on the set of allowable heights. In some examples, grouping may include dividing up the set of inventory items according to height. For example, inventory items 4" and below may be grouped in a first group, inventory items 6" and below to 4" may be grouped in a second group, and so on and so forth up to 12".

At 710, the process 700 sorts each height group of the set of height groups in accordance with a characteristic dimension. This may be performed by the inventory manipulation module 404. The characteristic dimension may be length or any other suitable characteristic, e.g., weight, volume or center of mass. Sorting in this manner may result in a sorted height group. From the sorted height group, items may be selected and placed as described herein.

At 712, the process 700 searches for space in a first allocated tray for a first item from a first sorted height group. This may be performed by the container space allocation module 406 (FIG. 4). The first allocated tray may have a height that corresponds to the height of the inventory items in the first sorted height group. The first allocated tray may be allocated in the sense that it has been marked as capable of receiving inventory items. In some examples, inventory trays may be allocated on demand such that a new tray is allocated after a search of existing trays reveals that there is insufficient free space for the particular inventory item. At 712, the first allocated tray is the first tray to be allocated in this cycle of the process 700. Thus, the process 700 may begin by searching for free space in the first allocated tray. Searching for free space may include evaluating the tray to identify free area in the first allocated tray that is large enough to receive the first item. In some examples, all area in a tray that has not been previously allocated to an inventory item may be considered "free." In other examples, only space that has been marked as "free" may be searched. In a single-layer approach, free space may be an area on the bottom of the first allocated tray that will accommodate the first item. In a dual- or multi-layer approach, free space may be an area on the bottom of the first allocated tray that will accommodate the first item and any area on top of an existing inventory item that will accommodate the first item and that has a footprint that is the same as or larger than that of the first item. In this manner, a stable inventory stack may be built.

At 714, the process 700 determines whether there exists space in the first allocated tray to accommodate the first inventory item. This may be performed by the container space allocation module 406. This may include evaluating the first allocated tray to determine what area has been allocated to other inventory items and what area is still available for allocations.

If the answer is YES at 714, the process 700 proceeds to 716 where a portion of the free space in the first allocated tray is allocated to the first item. This may be performed by the container space allocation module 406. This may include designating the free space as a packing location for the first inventory item. The portion of the free space may correspond to the extents of a multidimensional bounding box representative of the first item. In some examples, the portion of the free space allocated to the first item may be excluded from future searches.

If the answer is NO at 714, the process 700 continues to 718 where it is determined whether there is space in other allocated trays. This may be performed by the container space allocation module 406. In some examples, this may include searching other trays that may have been allocated prior to or after the first inventory tray. In some examples, all allocated trays that indicate that they have at least some free space (which may be above some configurable threshold) may be searched. In this manner, the process 700 seeks to place inventory items in an efficient arrangement. In some examples, blocks 712, 714, and/or 718 may be performed in accordance with one or more packing constraints. Packing constraints may be used to constrain the search beyond simply looking for free space for the first inventory item. Examples of packing constraints may include a velocity constraint, a removal constraint, a capacity constraint or any other suitable constraint. A velocity constraint may consider an anticipated time for retaining or storing the first item. A removal constraint may consider an ability for the first item to be removed from the first inventory tray by a human operator or an automated operator. For example, items oriented shortest side height may be easier to retrieve than those oriented shortest side width. A capacity constraint may consider load capacities that are particular to the first inventory tray, an inventory holder into which the first inventory tray will be packed, or a mobile drive unit that will lift and move the inventory holder.

If the answer at 718 is YES, the process 700 continues to 720 where a portion of the free space in one of the other allocated trays is allocated to the first inventory item. This may be performed by the container space allocation module 406. This may include designating the free space as a packing location for the first inventory item. The portion of the free space may correspond to the extents of a multidimensional bounding box representative of the first inventory item. In some examples, the portion of the free space allocated to the first inventory item may be excluded from future searches.

If the answer at 718 is NO, the process 700 continues to 722 where a new inventory tray is allocated to receiving inventory items. This may be performed by the container space allocation module 406. This may include accessing the next available inventory tray and adding it to the pool of allocated inventory trays. Given that the new inventory tray will likely be entirely free, at 724, the process 700 may allocate a portion of free space in the new inventory tray to the first inventory item. This may be performed by the container space allocation module 406. This may include designating the free space as a packing location for the first inventory item. In some examples, a mapping may be generated that indicates the packing location of the first inventory item with respect to whichever tray the first inventory item was placed in (e.g., the first allocated tray, one of the other allocated trays, or the new allocated tray). In the event that the new tray does not have sufficient space for the first inventory item, a notification may be generated and provided to a user indicating that the first inventory item is not capable of being stowed in a completely free inventory tray. This may be evidence that the first inventory item is too large to be stowed in the inventory trays or should be stowed in a custom tray. In some examples, the information describing the first inventory item may be provided to an overflow buffer along with other inventory items that for some reason cannot be stowed. The user may periodically check the overflow buffer to determine characteristics of items that are not being stowed.

FIG. 8 depicts the process 800 including example acts or techniques relating to generating packing instructions for height groups in accordance with at least one example. The inventory packing engine 316 (FIG. 3) of the inventory packing service 202 (FIG. 2) may perform the process 800 of FIG. 8. The process 800 begins at 802 by accessing a first height group. This may be performed by the inventory manipulation module 404 (FIG. 4). In some examples, the first height group may have previously been generated according to an allowable inventory tray height from a set of oriented items.

At 804, the process 800 sorts the first height group according to length. This may be performed by the inventory manipulation module 404.

At 806, the process 800 accesses a first item from the first height group. This may be performed by the container space allocation module 406 (FIG. 4). Accessing the first item may include accessing a first item in a sorted group of items. Thus, in some examples, the first item may be the item having the greatest length or shortest length in the first height group. Access of later items may be done sequentially. In some examples, the first item is neither the longest nor the shortest item, but is accessed initially based on some other constraint (e.g., velocity, weight, volume, center of mass).

At 808, the process 800 searches for existing free space among all allocated trays. This may be performed by the container space allocation module 406. In some examples, an allocated tray may have been previously allocated as part of identifying packing locations for other items from other height groups. Thus, in some examples, a single tray may include items from more than one height group. The allocated trays may be searched sequentially beginning with the earliest allocated.

At 810, the process 800 determines whether there is free space in any allocated tray searched at 808. This may be performed by the container space allocation module 406. If the answer at 810 is YES, the process 800 continues to 812 where the first item is stowed in one of the allocated height trays. Stowing the first item may include identifying in a data structure a packing location of the first item being in the allocated tray.

If the answer at 810 is NO, the process 800 continues to 814 where a next tray is allocated. This may be performed by the container space allocation module 406. Allocating the next tray may include selecting a next tray from a random set of trays and indicating the next tray as available for receiving items. In some examples, the set of trays is an ordered set of trays based on tray configurations (e.g., tray dimensions, number and location of dividers, etc.).

At 816, the process 800 stows the first item in the next tray. This may be performed by the container space allocation module 406.

At 818, the process 800 determines whether there are other items in the height group. This may be performed by the container space allocation module 406. If the answer at 818 is YES, the process 800 continues to 822 where blocks 806-818 are repeated for each of the other items identified at 818. In this manner, each item from the height group may be stowed in a tray. Searching for space for the other items may recursively return to previously allocated trays that still have free space remaining.

If the answer at 818 is NO, the process 800 continues to 824. At 824, the process 800 determines whether there are other height groups. If the answer at 824 is NO, the process 800 continues to 820 where a mapping is generated. Generating the mapping may be performed by the instruction generation module 408 (FIG. 4). Generating the mapping may include storing an indication that the first item was stowed in the allocated tray. In some examples, the mapping may indicate an area of the allocated tray where the first item was stowed (e.g., a quadrant, bin, row, or column). In some examples, the mapping may indicate a more precise location of the first item in the allocated tray (e.g., a set of Cartesian coordinates that define a midpoint or boundary of the first item with respect to the allocated inventory tray). The mapping may be used when the allocated tray is packed and unpacked.

If the answer at 824 is YES, the process 800 continues to 826 where blocks 802-824 are repeated for the other height groups.

FIG. 9 depicts the process 900 including example acts or techniques relating to evaluating a set of inventory trays in accordance with at least one example. The inventory packing engine 316 (FIG. 3) of the inventory packing service 202 (FIG. 2) may perform the process 900 of FIG. 9. The process 900 begins at 902 by identifying a set of inventory trays having varied configurations. This may be performed by the container space allocation module 406 (FIG. 4). The configurations may be varied with respect to height, divider locations, configurability of dividers, length and width, and any other suitable factor that may be varied. For example, assume each inventory tray in the set of inventory trays included one of four different heights (e.g., 4", 8", 10" or 12") and one of four different divider configurations (e.g., one lengthwise divider, two lengthwise dividers, one lengthwise divider and one widthwise divider, or two lengthwise dividers and two widthwise dividers). It is understood that many different height and divider configurations are possible other than those just described.

At 904, the process 900 accesses a set of inventory items. This may be performed by the inventory generation module 402 (FIG. 4), as described herein.

At 906, the process 900 searches for packing locations for inventory items in the set of inventory trays. This may be performed by the container space allocation module 406 (FIG. 4), as described herein.

At 908, the process 900 determines utilization of the set of inventory trays. This may be performed by the instruction generation module 408 (FIG. 4). In some examples, determining the utilization may include generating a utilization record for the set of inventory trays. This may indicate the extent to which each particular type of tray was utilized while searching for packing locations was performed at 906. For example, continuing with the example from above, the utilization record may indicate, for 100,000 Christmas-time inventory items, the number of the different inventory tray heights and configurations. The utilization record may also indicate how each inventory tray height and configuration ranks with respect to any of the parameters discussed herein such as GCU.

At 910, the process 900 eliminates a subset of inventory trays from the set of inventory trays. This may be performed by the instruction generation module 408. In some examples, the subset of inventory trays that are not utilized or are underutilized may be eliminated from consideration. The elimination may be automatic based on a utilization threshold. In other examples, the utilization record may be provided to an operator who may decide which configurations to eliminate.

Figure 10:
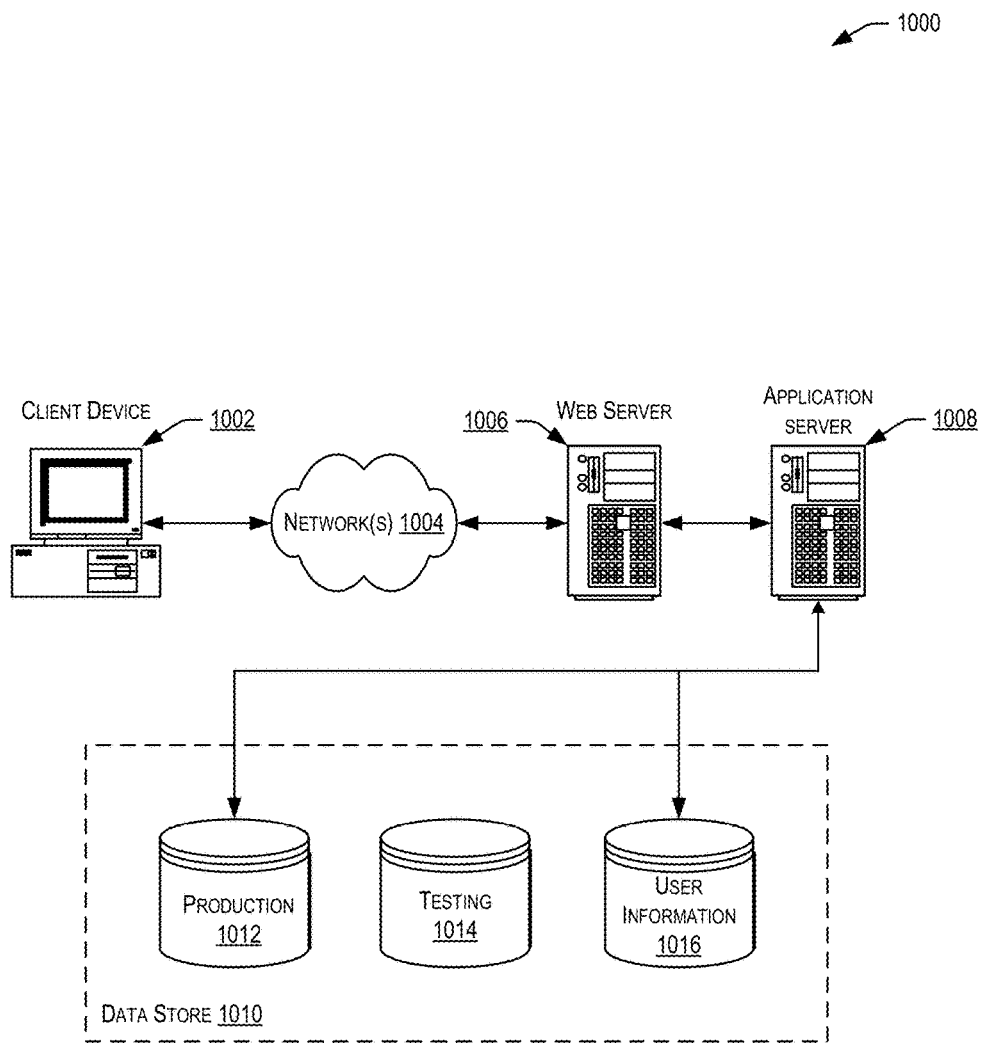
FIG. 10 is an example schematic environment for implementing techniques relating to determining packing locations for inventory items as described herein, according to at least one example.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a database comprising information identifying inventory items;
    an inventory packing service in communication with the database and configured with a memory and a processor configured to:
        access a set of inventory items from the database, individual inventory items of the set of inventory items having various dimensions represented by multidimensional bounding boxes;
        orient, based at least in part on an orientation rule, each inventory item of the set of inventory items, the orientation rule comprising at least one of: a shortest side height orientation rule, a stability orientation rule, or a shortest side width orientation rule;
        identify a set of allowable heights for the set of inventory items, the set of allowable heights corresponding to a set of predefined height dimensions of inventory trays configured to receive the inventory items;
        group, based at least in part on the set of allowable heights, the set of inventory items into a set of height groups;
        sort, based at least in part on a characteristic dimension, a first height group from the set of height groups to create a first sorted height group, the characteristic dimension corresponding to a characteristic of an inventory item in the first height group;
        determine a first packing location of a first inventory item in the first sorted height group at least by:
            allocating a first inventory tray for at least receiving inventory items of the first sorted height group, the first inventory tray having a height dimension corresponding to the first sorted height group;
            identifying first free space in the first inventory tray to at least accommodate the first inventory item; and
            allocating a portion of the first free space in the first inventory tray to the first inventory item as the first packing location;
        generate a set of inventory packing instructions comprising a mapping that indicates the first packing location of the first inventory item with respect to the first inventory tray; and
        cause packing of the first inventory item at the first packing location based at least in part on the set of inventory packing instructions.

2. The system of claim 1, wherein the inventory packing service is further configured to:
    allocate a second inventory tray for at least receiving the inventory items of the first sorted height group, the second inventory tray having the height dimension;
    determine a second packing location of a second inventory item in the first sorted height group at least by:
        determining that the first inventory tray lacks second free space to at least accommodate the second inventory item;
        determining that the second inventory tray lacks third free space to at least accommodate the second inventory item;
        allocating a third inventory tray for at least receiving the inventory items of the first sorted height group, the third inventory tray having the height dimension;
        identifying fourth free space in the third inventory tray to at least accommodate the second inventory item; and
        allocating a portion of the fourth free space in the third inventory tray to the second inventory item as the second packing location; and
    update the mapping of the set of inventory packing instructions to indicate the second packing location of the second inventory item with respect to the third inventory tray.

3. The system of claim 1, wherein the inventory packing service is further configured to:
 determine a holding location for the first inventory tray in an inventory holder at least by:
  searching one or more locations of the inventory holder to identify second free space at the one or more locations to at least accommodate the first inventory tray;
  allocating a first location of the inventory holder to receiving the first inventory tray, in the event the one or more locations do not have sufficient space for receiving the first inventory tray;
  identifying the second free space at the first location to at least accommodate the first inventory tray; and
  allocating a portion of the second free space at the first location to the first inventory tray as the holding location; and
 update the mapping of the set of inventory packing instructions to indicate the holding location of the first inventory tray with respect to the inventory holder.

4. The system of claim 1, wherein the first inventory tray comprises a plurality of bins, the first packing location located within a first bin of the plurality of bins.

5. A computer-implemented method, comprising:
 accessing a plurality of inventory items having various dimensions;
 identifying a plurality of trays into which the plurality of inventory items can be packed, the plurality of trays having various predefined height dimensions;
 grouping the plurality of inventory items into one or more groups based at least in part on an orientation rule and the various predefined height dimensions of the plurality of trays;
 searching for first free space in a first allocated tray to function as a packing location for a first inventory item of a first group of the one or more groups, the first allocated tray allocated for receiving inventory items of the plurality of inventory items;
 in the event the first free space in the first allocated tray is found, at least:
  generating a set of inventory packing instructions comprising an inventory mapping that identifies the packing location for the first inventory item in the first allocated tray; and
  causing packing of the first inventory item at the packing location based at least in part on the set of inventory packing instructions; and
 in the event the first free space in the first allocated tray is not found, at least:
  allocating a second tray for receiving the inventory items from the plurality of inventory items;
  searching for second free space in the second allocated tray for receiving the first inventory item from the first group; and
  allocating a portion of the second free space in the second allocated tray as the packing location for the first inventory item.

6. The computer-implemented method of claim 5, further comprising:
 prior to grouping, orienting the plurality of inventory items in accordance with the orientation rule comprising at least one of: a shortest side height orientation rule, a stability orientation rule, or a shortest side width orientation rule; and
 prior to searching for the first free space, sorting, based at least in part on a length dimension, respective inventory items in the one or more groups such that the one or more groups each include the respective inventory items arranged according to length, wherein the first inventory item has a longest length or a shortest length of its respective group.

7. The computer-implemented method of claim 5, further comprising generating a different mapping that indicates the packing location of the first inventory item with respect to the second allocated tray.

8. The computer-implemented method of claim 7, wherein, in the different mapping, the packing location is represented by coordinates in a Cartesian coordinate system aligned with respect to the second allocated tray.

9. The computer-implemented method of claim 5, further comprising:
 prior to allocating the second tray, searching for the first free space in a third allocated tray, the third allocated tray previously allocated for receiving the inventory items of the plurality of inventory items.

10. The computer-implemented method of claim 5, further comprising retaining information describing remaining free space in the second allocated tray after the portion of the second free space has been allocated as the packing location for the first inventory item.

11. The computer-implemented method of claim 10, further comprising:
 searching for third free space in the first allocated tray to function as a second packing location for a second inventory item of the first group of the one or more groups;
 in the event the third free space in the first allocated tray is not found, at least:
  searching for fourth free space in the remaining free space of the second allocated tray; and
  allocating a portion of the fourth free space in the second allocated tray as the second packing location for the second inventory item.

12. The computer-implemented method of claim 5, wherein a composition of the plurality of inventory items having various dimensions varies with respect to one or more of geographic location or season.

13. The computer-implemented method of claim 5, wherein the plurality of trays include various arrangements of tray dividers disposed therein, and the method further comprising:
 determining utilizations of the various arrangements of tray dividers as packing locations for individual inventory items of the plurality of inventory items; and
 removing certain arrangements of tray dividers from the various arrangements of tray dividers in accordance with a utilization threshold.

14. The computer-implemented method of claim 5, wherein allocating the portion of the second free space in the second allocated tray as the packing location for the first inventory item comprises allocating the portion of the second free space in accordance with a packing constraint comprising at least one of:
 a velocity constraint that considers an anticipated time for retaining the first inventory item before shipment;
 a removal constraint that considers an ability for the first inventory item to be removed from the packing location by a human operator or an automated operator;
 a perception constraint that considers perceptibility of the first inventory item with respect to other inventory items adjacent to the first inventory item; or
 a capacity constraint that considers load capacities of one or more of:

a particular tray into which the first inventory item will be packed;

an inventory holder into which the particular tray will be packed; or a mobile drive unit that will transport the inventory holder.

15. The computer-implemented method of claim 5, wherein the inventory mapping comprises a unique association between the first inventory item and the packing location, the packing location comprising an unique address of the first inventory item in a warehouse environment.

16. The computer-implemented method of claim 5, wherein causing packing of the first inventory item comprises providing the inventory mapping as a human-readable instruction to a human operator for the human operator to pack the first inventory item or providing the inventory mapping as a machine-readable instruction to an automated operator for the automated operator to pack the first inventory item.

17. A computer-implemented method, comprising:

accessing a set of inventory items oriented according to at least one of a shortest side height orientation rule or a stability orientation rule;

identifying an inventory tray into which inventory items of the set of inventory items can be packed, the inventory tray having a first height dimension and including one or more tray dividers capable of dividing the inventory tray into one or more bins;

sorting the set of inventory items based at least in part on a characteristic dimension to create a set of sorted inventory items;

searching for first free space in the inventory tray for receiving a first inventory item from the set of sorted inventory items;

identifying a portion of the first free space in the inventory tray as a first packing location for the first inventory item, the portion of the first free space lying within a first bin of the one or more bins;

searching for second free space in the inventory tray for receiving a second inventory item from the set of sorted inventory items, the second free space including an extruded space lying above the portion of the first free space;

identifying a portion of the second free space in the inventory tray as a second packing location for the second inventory item;

generating a set of inventory packing instructions comprising a mapping that identifies the first packing location of the first inventory item with respect to the inventory tray and the second packing location of the second inventory item with respect to the inventory tray; and causing packing of the first and second inventory items based at least in part on the set of inventory packing instructions.

18. The computer-implemented method of claim 17, wherein the set of inventory items comprises a set of three-dimensional representations, individual three-dimensional representations of the set of three-dimensional representations corresponding in size and shape to individual inventory items of the set of inventory items.

19. The computer-implemented method of claim 17, wherein the second packing location ties within the extruded space above the portion of the first free space in which the first packing location is located, and wherein a first bottom surface area of the first inventory item is greater than or equal to a second bottom surface area of the second inventory item.

* * * * *